(12) United States Patent  (10) Patent No.: US 8,619,097 B2
Shi  (45) Date of Patent: Dec. 31, 2013

(54) REMOTE INSTRUCTION SYSTEM, REMOTE INSTRUCTION METHOD, AND PROGRAM PRODUCT THEREFOR

(75) Inventor: Meng Shi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1767 days.

(21) Appl. No.: 11/580,958

(22) Filed: Oct. 16, 2006

(65) Prior Publication Data

US 2007/0263254 A1 Nov. 15, 2007

(30) Foreign Application Priority Data

May 12, 2006 (JP) ................................ 2006-133657

(51) Int. Cl.
*G09G 5/00* (2006.01)
(52) U.S. Cl.
USPC ......................................... 345/632; 345/629
(58) Field of Classification Search
USPC ................................................ 345/629, 632
See application file for complete search history.

(56) References Cited

U.S. PATENT DOCUMENTS

2004/0070674 A1    4/2004  Foote et al.
2005/0193350 A1*   9/2005  Ishiguro et al. ............... 715/794
2006/0061777 A1*   3/2006  Duggan et al. ................. 358/1.1

\* cited by examiner

*Primary Examiner* — Jeffrey Chow
(74) *Attorney, Agent, or Firm* — Oliff and Berridge, PLC (57) ABSTRACT

A remote instruction system comprising an annotation forming portion that: overlay-displays an image of a target taken by an image taking portion, in a display area of application software; displays an edited image in the display area by use of the application software; extracts the edited image displayed according to a difference between displayed images prior to and subsequent to a generation of the edited image; and forms an annotation image from the edited image extracted to project the annotation image onto an image-taken area of the image taking portion by a projecting portion according to an instruction given on the basis of a taken image.

16 Claims, 8 Drawing Sheets

REMOTE INSTRUCTION SYSTEM, REMOTE INSTRUCTION METHOD, AND PROGRAM PRODUCT THEREFOR

BACKGROUND

1. Technical Field

This invention generally relates to a remote instruction system, by which an instruction can be given by use of an image.

2. Related Art

In a remote repair system, a remote maintenance system, a remote medical system, a remote conferencing system, and the like, for example, various instructions that may include a real object, such as instructions on the procedure or the like, have to be given to a real object from a remote site. As such a remote instruction system by which the instructions can be given to the real object from the remote site, there is known a technique of projecting an annotation image instructed from a remote terminal according to a taken image onto the real object by a projector on the real object side, while the real object existent on the real object side is being taken by a camcorder to be sent to the remote terminal.

SUMMARY

An aspect of the present invention provides a remote instruction system comprising an annotation forming portion that: overlay-displays an image of a target taken by an image taking portion, in a display area of application software; displays an edited image in the display area by use of the application software; extracts the edited image displayed according to a difference between displayed images prior to and subsequent to a generation of the edited image; and forms an annotation image from the edited image extracted to project the annotation image onto an image-taken area of the image taking portion by a projecting portion according to an instruction given on the basis of a taken image.

BRIEF DESCRIPTION OF THE DRAWINGS

Embodiments of the present invention will be described in detail based on the following figures, wherein.

DETAILED DESCRIPTION

Figure 1:
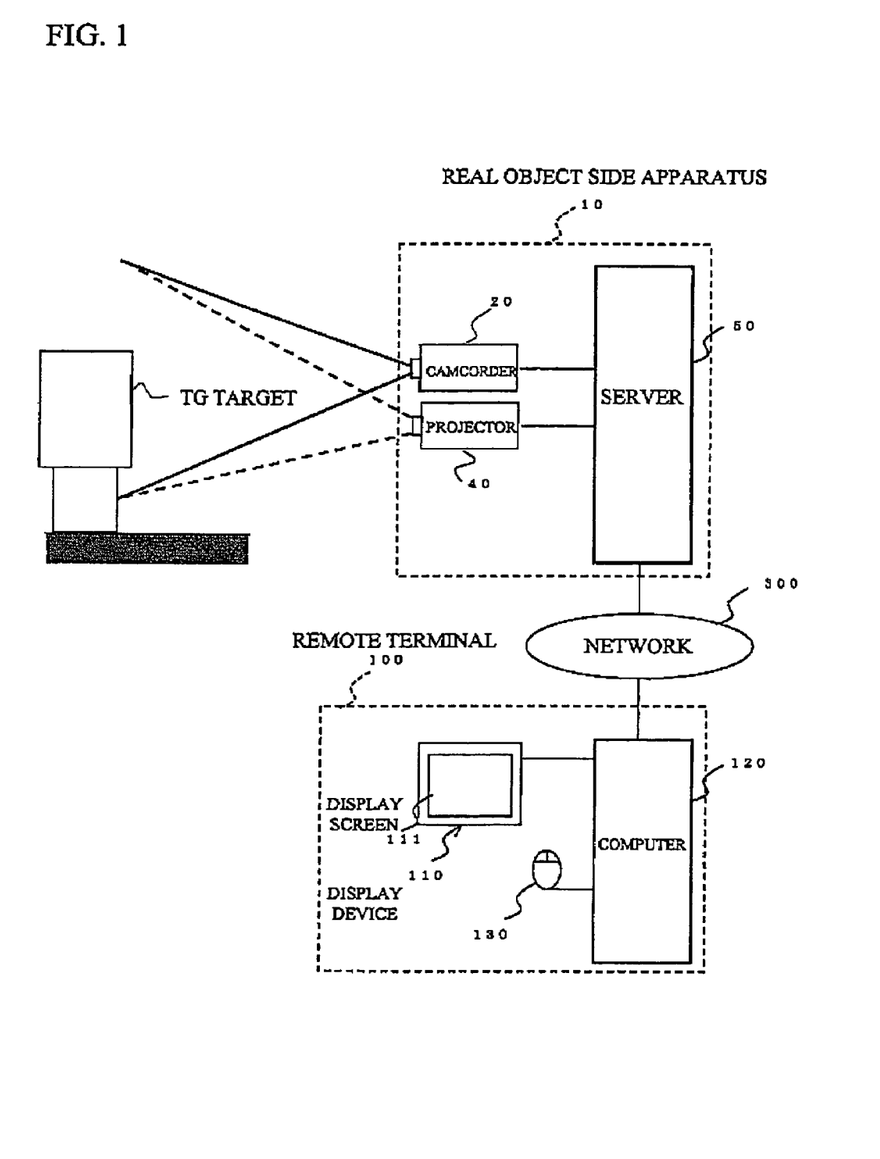
FIG. 1 is a configuration diagram of a remote instruction system according to an aspect of the present invention.

A description will now be given, with reference to the accompanying drawings, of embodiments of the present invention. FIG. 1 is a configuration diagram of a remote instruction system according to an aspect of the present invention. The instruction system is provided with a real object side apparatus 10, a remote terminal 100, and the like. The real object side apparatus 10 and the remote terminal 100 are connected to enable communication with each other. Here, in FIG. 1, only one remote terminal 100 is shown, whereas multiple remote terminals 100 may be connected through a network 300 to the real object side apparatus 10.

The real object side apparatus 10 is provided with a camcorder 20 serving as an image taking portion, a projector 40 serving as a projecting portion, a server 50 serving as a controller, and the like.

The camcorder 20 is composed, for example, of a CCD camera or the like, and is located such that the camcorder 20 can take a target TG. Such taken image is loaded onto the server 50.

The projector 40 is adjacently arranged with the camcorder 20 in such a manner that the field angle (field of view) thereof substantially corresponds to that of the camcorder 20. A liquid crystal projector or the like is used for the projector 40.

The server 50 controls the operation of the camcorder 20 and that of the projector 40, and sends and receives various types of information to and from the remote terminal 100 via the network 300. The server 50 sends the image taken by the camcorder 20 to the remote terminal 100, and projects the annotation image created according to an instruction given by the remote terminal 100, on the basis of such taken image, onto the target TG by means of the projector 40. The annotation image may include any type of image, such as line, character, drawing, and the like. The projector 40 is capable of projecting the annotation image not only onto the target TG but also onto another target included in the field angle (field of view) of the camcorder 20.

The remote terminal 100 is composed of a display device 110 such as a liquid crystal display, CRT, or the like, a computer 120 connected to the network 300, a pointing device (mouse) 130 connected to the computer 120, and the like. The display device 110 displays the image or the like transmitted from the real object side apparatus 10 to a display screen 111.

Figure 2:
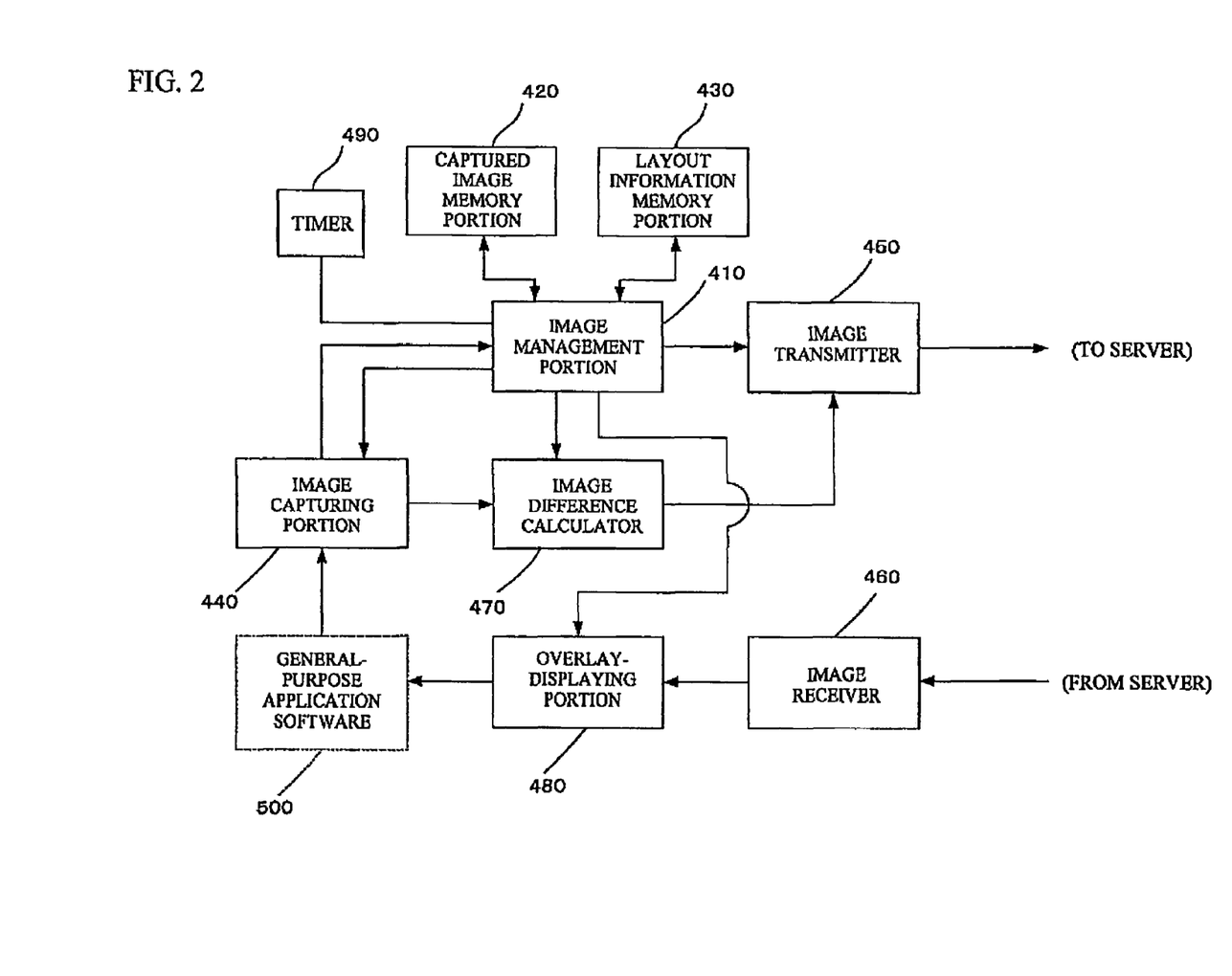
FIG. 2 is a functional block diagram showing substantial parts of a computer of a remote terminal.

FIG. 2 is a functional block diagram showing substantial parts of the computer 120 of the remote terminal 100. Each of the functional blocks is composed of a processor, semiconductor memory, memory device, hardware of a communication device, necessary software, or the like. The computer 120 is provided with an image management portion 410, a captured image memory portion 420, a layout information memory portion 430, an image capturing portion 440, an image transmitter 450, an image receiver 460, an image difference calculator 470, an overlay-displaying portion 480, general-purpose application software 500, and the like. An annotation forming portion employed in the present invention is composed of the image management portion 410, the image capturing portion 440, the image difference calculator 470, the overlay-displaying portion 480, and the like.

The general-purpose application software (here in after, simply referred to as application) 500 may be commonly used software executable on the computer 120 that has the display screen 111 on which an editing window (display area) is displayed and that has a drawing function. Also, a single application 500 may be executed, whereas multiple applications 500 may be executed simultaneously.

The image management portion 410, as described later, manages various processes for the image such as display, creation, storage, transmission or the like, in a comprehensive manner. The image receiver 460 receives the captured image of the target TG transmitted from the server 50 to output to the overlay-displaying portion 480. The overlay-displaying portion 480 displays the captured image of the target TG to overlay at a designated position in the window of the designated application 500, according to the instruction given by the image management portion 410. This allows a user to view the image taken by the camcorder 20 on the window (graphical image) of the application 500.

The image capturing portion 440 acquires the window (graphical image) of the application 500 according to the instruction given by the image management portion 410, and outputs to the image management portion 410 and the image difference calculator 470. The image management portion 410 outputs an instruction to acquire an window image of the application 500 to the image capturing portion 440, according to an interrupt of a timer 490, an event raising, and a user's instruction, or the like.

The image difference calculator 470 extracts an edited image generated in the window by a user's editing operation of the application 500, according to a difference between the displayed images on the window respectively acquired prior to and subsequent to the generation of the edited image, and forms an annotation images with such extracted edited image to output to the image transmitter 450. Various types of information that include a control instruction given by the image management portion 410 or the image data of the window is input into the image difference calculator 470.

The image transmitter 450 transmits a captured image (annotation image) of the window of the application 500 acquired from the image management portion 410, or transmits the annotation image on the basis of a differential image formed on the image difference calculator 470, to the server 50. Here, the annotation image includes any type of the image such as character, drawing, a native view of the application and the like. In other words, all images that can be projected onto the target TG or the like may be included in the annotation image.

The captured image memory portion 420 stores the window image captured by the image capturing portion 440. Various images can be projected onto the target TG rapidly and easily, by storing various captured images in the captured image memory portion 420. The layout information memory portion 430 stores an overlay-displaying position of the captured image in the window of the general-purpose application 500, information on displaying an area from which the image is to be captured on the window, and information on capturing, for example, a captured area in the display screen. The afore-described information may be set by a user in advance.

Figure 3:
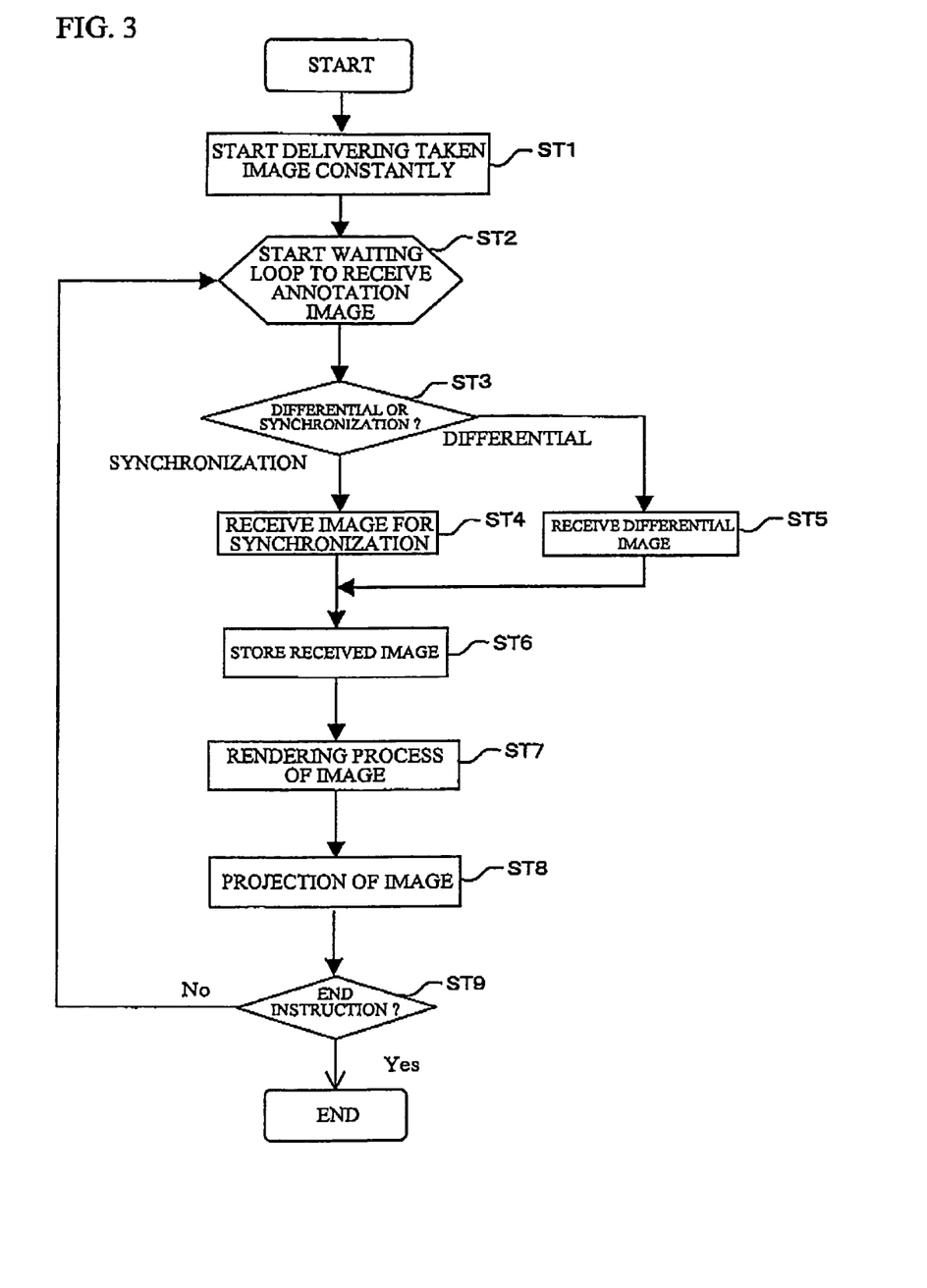
FIG. 3 is a flowchart showing a process example on a server.
Figure 4:
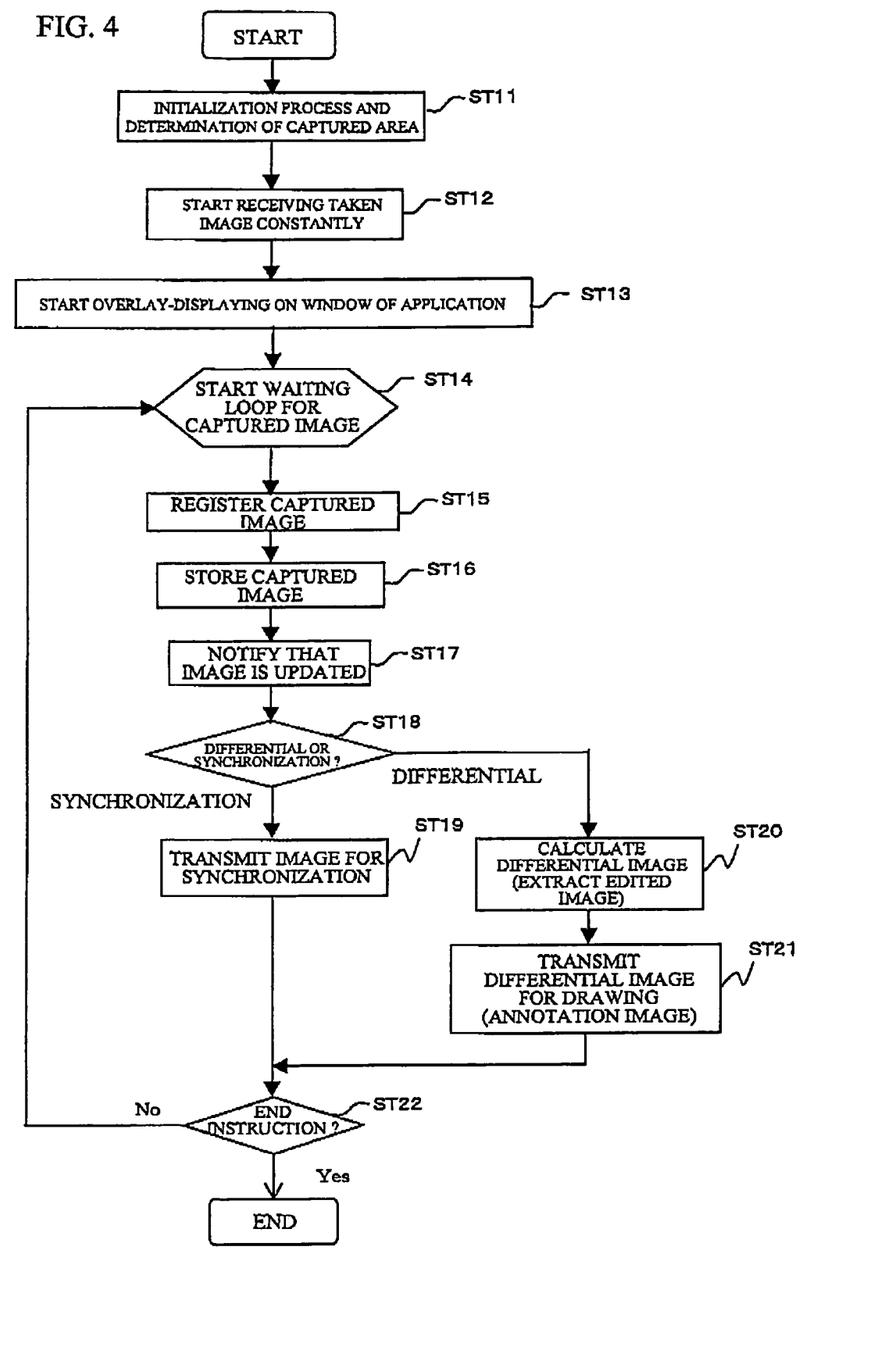
FIG. 4 is a flowchart showing a process example on the computer of the remote terminal.
Figure 5A:
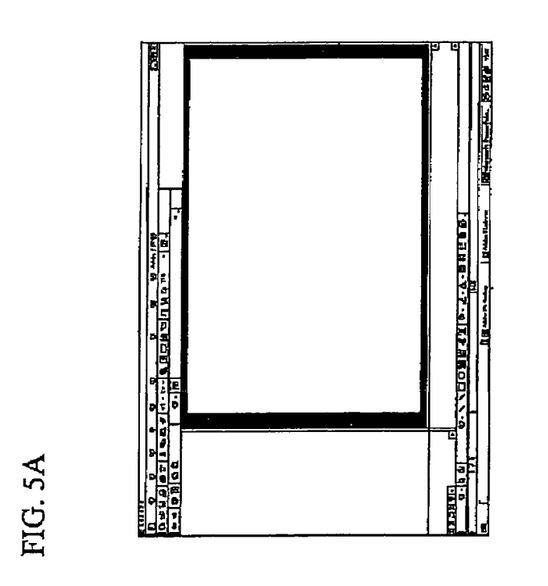
FIG. 5A and FIG. 5B show an example of a window image of application prior to and subsequent to overlay-displaying.
Figure 5B:
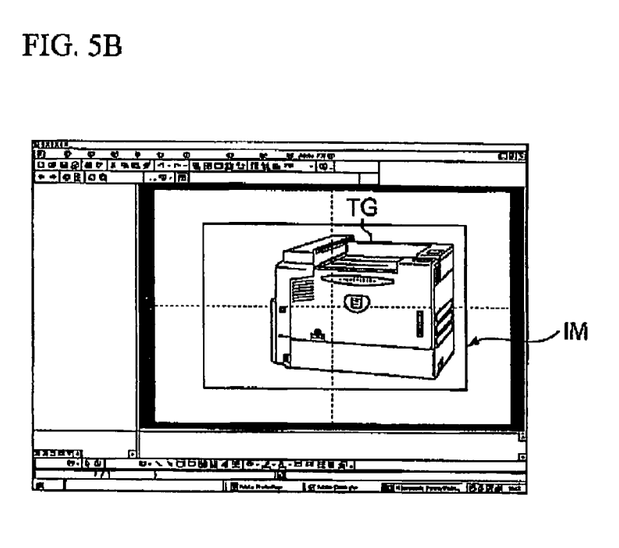
Figure 6:
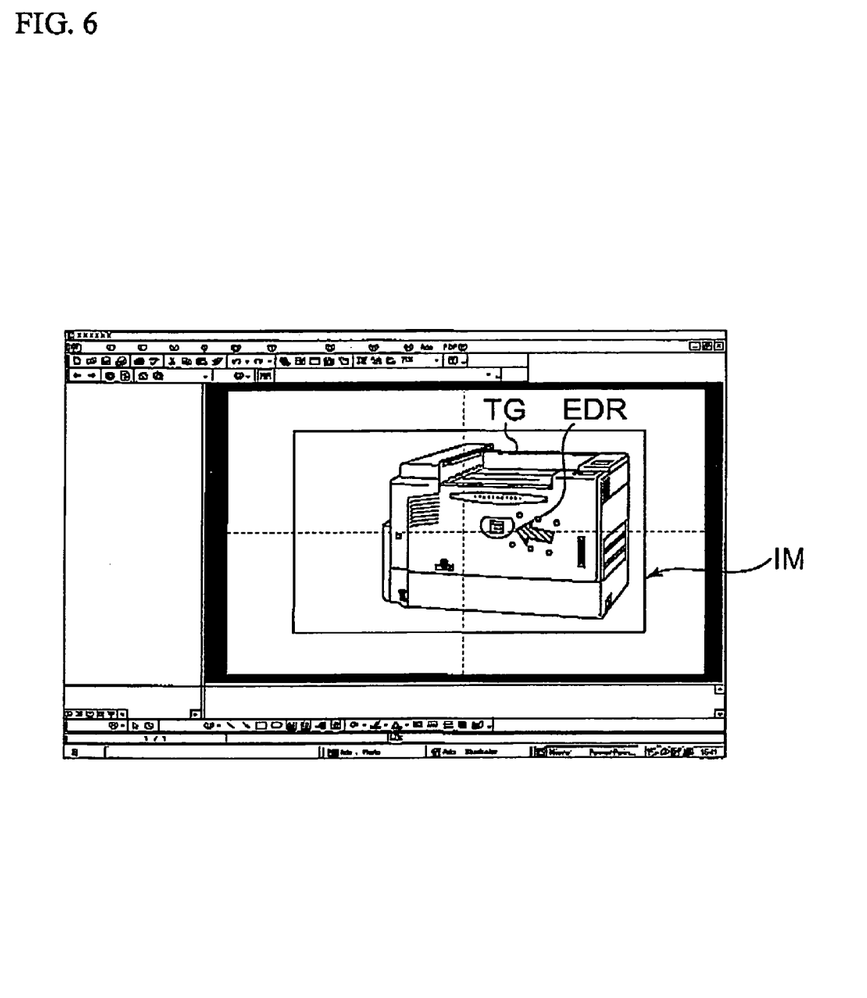
FIG. 6 illustrates an edited image formed on a window of the application.
Figure 7:
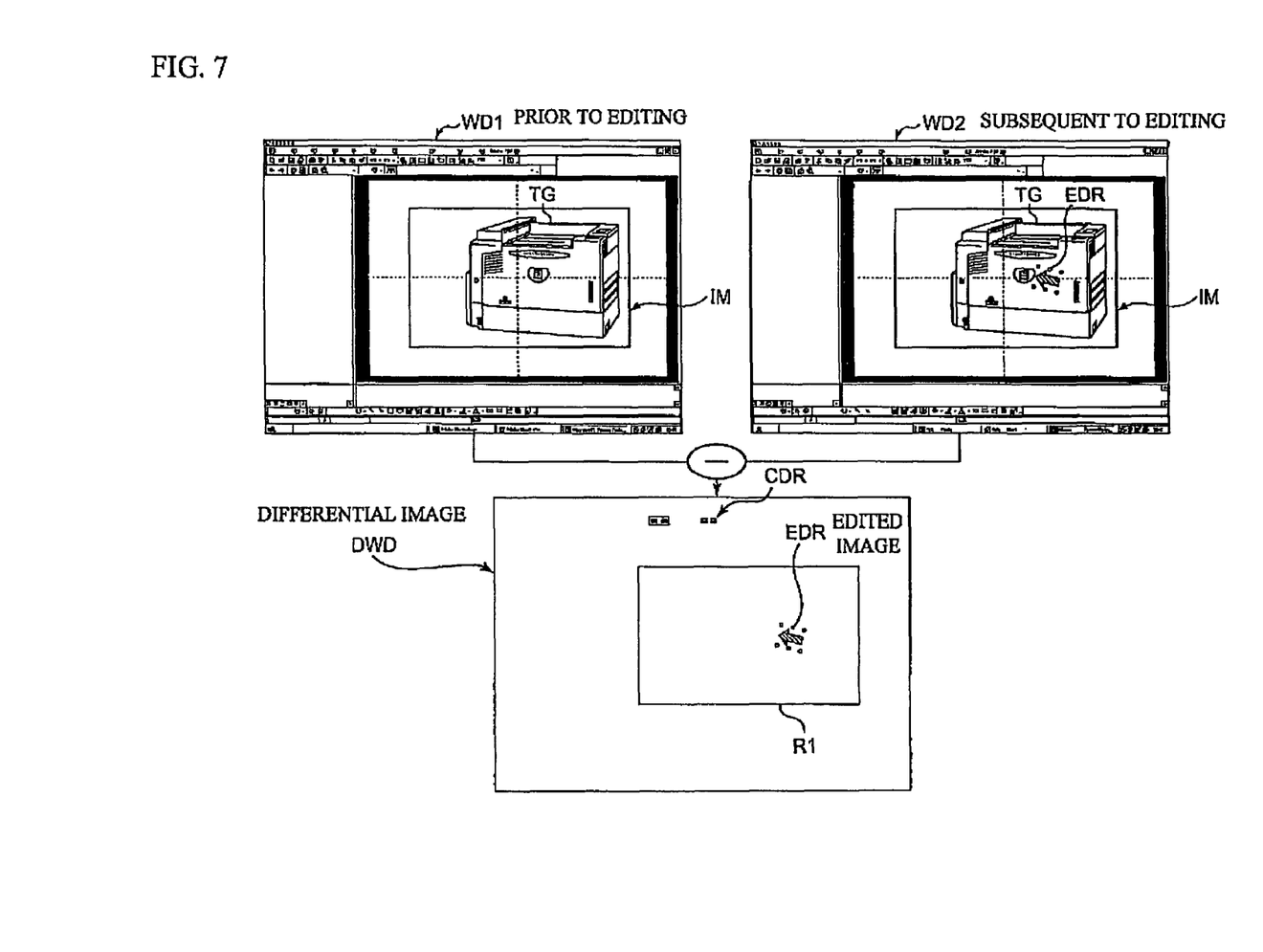
FIG. 7 illustrates a differential image formation method.
Figure 8:
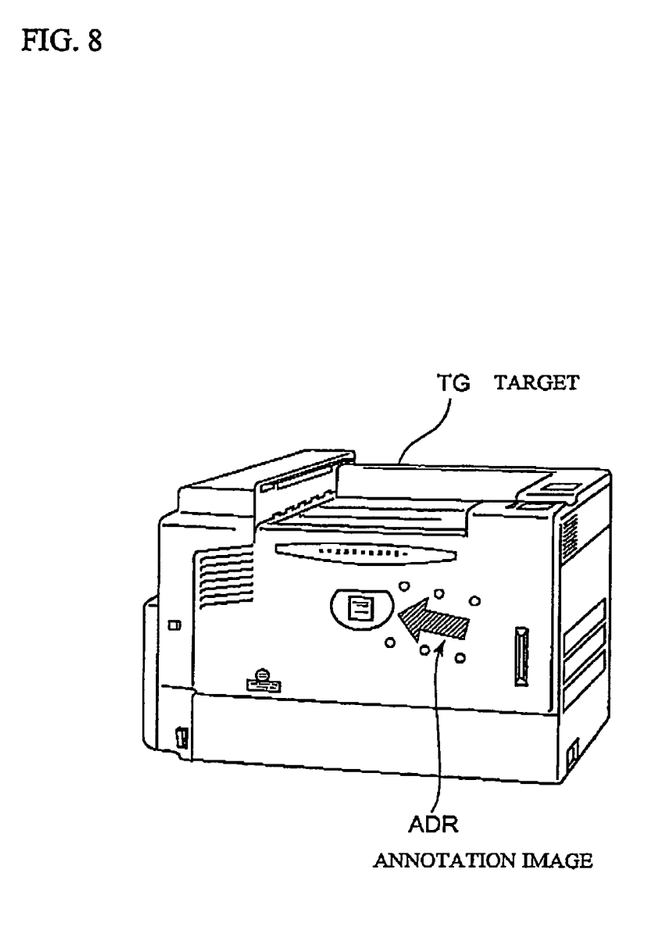
FIG. 8 illustrates an annotation image formed by editing operation of the application projected onto a target.

A description will now be given, with reference to FIG. 3 through FIG. 8, of an operation example of the remote instruction system as described heretofore. Specifically, FIG. 3 is a flowchart showing a process example on the server. FIG. 4 is a flowchart showing a process example on the computer of the remote terminal. FIG. 5A and FIG. 5B show an example of the window image (displayed image) of the application prior to and subsequent to overlay-displaying. FIG. 6 illustrates an edited image formed on the window of the application. FIG. 7 illustrates a differential image forming method. FIG. 8 illustrates the annotation image formed by editing operation of the application projected onto the target.

Firstly, a description will be given of the process on the server 50. Referring now to FIG. 3, an operation is initialized such that the image taken by the camcorder 20 is constantly delivered to all of one or more remote terminals 100 (step ST1).

Next, the server 50 starts a waiting loop to receive the annotation image from the remote terminal 100 (step ST2). During the waiting loop, the image taken by the camcorder 20 is delivered to each of the one or more remote terminals 100 on a regular basis.

Upon receiving the annotation image from the remote terminal 100, the server 50 determines whether the annotation image is an image for synchronization or the differential image (step ST3). If the annotation image is the image for synchronization, the server 50 receives the image for synchronization (step ST4). If the annotation image is the differential image, the server 50 receives the differential image (step ST5).

Then, the server 50 stores such received image for synchronization or differential image in the storage device such as a hard disc or the like (step ST6). A rendering process is implemented on such received image so that such received image for synchronization or differential image is projected by the projector 40 (step ST7).

After that, the server 50 projects the image for synchronization or the differential image by means of the projector 40 (step ST8). In this manner, the annotation image composed of the image for synchronization or the differential image, transmitted from the remote terminal 100, is projected onto the target TG or the like. The image of the target TG onto which the annotation image is projected is taken by the camcorder 20 and delivered to each of one or more remote terminals 100. This makes it possible to understand, on the remote terminal 100, that the annotation image instructed by the remote terminal 100 is displayed. In addition, the server 50 repeats the afore-described process until the server 50 receives an end instruction (step ST9).

A description will now be given of a process on the computer 120 of the remote terminal 100. Here, it is assumed that one or more applications 500 are activated on the computer 120 and one or more editing windows thereof are being displayed on the display screen 111. Referring now to FIG. 4, first, the computer 120 determines various initialization processes that include, for example, a display position of the window of the application 500 or on which application 500 an overlay displaying is performed, and also determines the area of the image to be captured on the display screen 111 of the display device 110 (step ST11). The afore-mentioned processes may be implemented according to the predetermined information, or may be set by a user one by one.

Next, the computer 120 starts receiving the image taken by the camcorder constantly from the server 50 (step ST12). This enables a newest image to be provided to the computer 120 constantly.

Then, the computer 120 starts overlay-displaying such received image taken by the camcorder 20 on the window of the application 500 (step ST13). Referring now to FIG. 5A, nothing is displayed on the window of the application 500 drawn on the display screen 111, prior to the overlay-displaying. Referring to FIG. 5B, when overlay-displaying starts, a taken image IM that includes the target TG, for example, a printer taken by the camcorder 20 is overlay-displayed on the editing screen of the window.

The computer 120 implements a waiting loop until an instruction is given to the image capturing portion 440 to capture the window image of the application 500 (step ST14). The window image of the application 500 is repeatedly captured according to a user's instruction such as editing operation or the like, a timer interrupt, a given event generation, an explicit instruction given by a user, or the like, and the computer 120 implements a process of registering the window image (step ST15). The window image shown in FIG. 5B is captured and registered. If the timer interrupt is made, the window image is captured in a given time cycle. Also, a user uses a drawing function of the application 500 by means of mouse operation, while watching the captured image IM in the window. For example, as shown in FIG. 6, an edited image EDR is drawn to form the annotation image. The window image of the application 500 on which the edited image EDR is drawn is also captured and registered. The computer 120 stores such registered window image in the storage device (step ST16).

After that, when the captured image IM is overlay-displayed on the editing screen of the window and the window image is updated, or if the edited image is formed, the computer 120 notifies that the window image is updated to the server 50 (step ST17).

The computer 120 determines whether the annotation image to be sent to the server 50 is the image for synchronization or the differential image (step ST18). The image for synchronization is an image captured from a given area of the window of the application 500. The differential image is an image obtained by a difference of the window images of the application 500. Which the image for synchronization or the differential image is used may be determined on the basis of the user's instruction, or may be determined automatically. The computer 120 sends the image captured from a given area of the window of the application 500 to the server 50 as an annotation image (step ST19).

When the computer 120 determines that the differential image is to be sent at step ST18, the computer 120 calculates the differential image and extracts the edited image generated in the window of the application 500 by a user's editing operation.

Here, when WD1 is a window image (displayed image) prior to editing shown in FIG. 5B (prior to the generation of the edited image), and WD2 is a window image (displayed image) subsequent to editing shown in FIG. 6 (subsequent to the generation of the edited image), a differential image DWD is shown in FIG. 7 and the edited image EDR can be extracted.

Here, when the difference between the edited window image WD1 prior to editing and the edited window image WD2 subsequent to editing is calculated, the differential image DWD includes the edited image EDR formed by the editing operation, as shown in FIG. 7, and also includes an unnecessary image CDR. For this reason, an area R1 to be cut from the differential image DWD is predetermined, so that only the edited image EDR included in the area R1 is regarded as a necessary annotation image to be sent to the server 50 (step ST21). The area R1 may be substantially equal to the field of view of the camcorder 20, or may be a part in the field of view of the camcorder 20. The remote terminal 100 repeatedly implements the afore-described process until the remote terminal 100 receives an end instruction (step ST22).

When the annotation image composed of the edited image EDR is sent to the server 50, for example, an annotation image ADR composed of the edited image EDR is projected onto the target TG, as shown in FIG. 5O. This makes it possible to give an instruction to the real object side from the remote terminal 100 by use of an image. According to an aspect of the present invention, the general-purpose application 500 is used so that the annotation image can be generated automatically by the editing operation, thereby allowing a user to perform an operation for a remote instruction by use of the existing application comfortably.

Even when multiple applications 500 are activated and executed concurrently, each of the applications 500 forms an annotation image to project onto the target TG respectively. Also, a CAD file or the like may be retrieved from the storage device such as a hard disc or the like and displayed on the window of the application 500, so that CAD data may be projected onto the target TG as an annotation image without change. A drawn figure or the like displayed on the window of one application may be copied to that of another application, while multiple applications 500 are being activated simultaneously, so the copied image is set to the annotation image. In addition, in lieu of copying the image, kinds of application software executed in parallel may be employed so that multiple applications may be executed in parallel to form an annotation image by selectively changing the application software as necessary. Furthermore, various annotation images of multiple kinds of application software may be received from multiple clients in parallel, by means of the centralized management on the server side.

According to an aspect of the present invention, a description has been given of a case where the annotation forming portion that forms an annotation image by use of the general-purpose application 500 is included in the remote terminal 100. However, the present invention is not limited thereto. For example, the annotation forming portion may be provided in, for example, the server 50.

The description has also been given to a configuration in which the server 50 controls both the camcorder 20 and the projector 40. However, the present invention is not limited thereto. Different computers may control the camcorder 20 and the projector 40 respectively.

According to an aspect of the present invention, the description has been given of the target TG having a stereoscopic shape such as a printer or the like, as an example. However, the present invention is not limited thereto. A planar target such as a whiteboard may be used. Also, a stereoscopic object and a planar object may be used together.

There is the possibility of a case where the annotation image cannot be projected onto a target position of the real object precisely, due to the server-client relationship, the type of application that retrieves the captured image, the difference in the region, or the like. In such a case, if the annotation image drawn on the window of the application software and projected is deviated from a target position, it may be configured such that this deviation is calibrated by the parameter adjustment automatically or manually to project onto a desired position.

A remote instruction method employed as an aspect of the present invention is realized with a Central Processing Unit (CPU), Read Only Memory (ROM), Random Access Memory (RAM), and the like, by installing a program from a portable memory device or a storage device such as a hard disc device, CD-ROM, DVD, or a flexible disc or downloading the program through a communications line. Then the steps of program are executed as the CPU operates the program.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A remote instruction system comprising:
    an annotation forming portion that:
        overlay-displays a first still frame image of a target taken by an image taking portion, in a display area of application software, the image taking portion having captured the first still frame image from a video signal;

displays an edited still frame image in the display area by use of the application software;

extracts the edited still frame image displayed according to a difference between displayed still frame images prior to and subsequent to a generation of the edited still frame image; and forms an annotation image from the edited image extracted to project the annotation image onto an image-taken area of the image taking portion by a projecting portion according to an instruction given on the basis of a taken image, and a layout information memory portion that stores image capturing information, including at least an overlay-displaying position of the captured first still frame image in the display area and information from the display area from which the first still frame image is to be captured, wherein the annotation forming portion forms the annotation image by use of a plurality of kinds of the application software executed in parallel.

2. The remote instruction system according to claim 1, further comprising:

a server that controls the image taking portion and the projecting portion; and a remote terminal that receives the taken image from the server, has the annotation forming portion, and sends the annotation image to the server.

3. The remote instruction system according to claim 1, wherein the annotation forming portion acquires the displayed still frame images in the display area prior to and subsequent to the generation of the edited still frame image according to a user's operation.

4. The remote instruction system according to claim 1, wherein the annotation forming portion extracts the edited still frame image from the displayed images in the display area, the displayed images being captured in a given time cycle.

5. The remote instruction system according to claim 1, wherein the edited still frame image is formed by use of a function of the application software.

6. The remote instruction system according to claim 1, wherein the edited still frame image includes an image copied from another kind of application software.

7. The remote instruction system according to claim 1, wherein the application software is internal to the remote instruction system.

8. The remote instruction system according to claim 1, wherein the application software is internal to the annotation forming portion.

9. The remote instruction system according to claim 1, wherein the application software is external to the target.

10. The remote instruction system according to claim 1, wherein the application software is external to the image taking portion.

11. The remote instruction system according to claim 1, wherein the application software is external to the projection portion.

12. The remote instruction system according to the claim 1, wherein the application software is external to the target, the image taking portion, and the projection portion.

13. A remote instruction method comprising:

overlay-displaying a first still frame image of a target taken in a display area of application software, the first still frame image having been captured from a video signal;

displaying an edited still frame image in the display area by use of the application software;

extracting the edited still frame image displayed according to a difference between displayed still frame images prior to and subsequent to a generation of the edited still frame image;

forming an annotation image from the edited still frame image extracted to project the annotation image onto an image-taken area according to an instruction given on the basis of a taken image; and storing image capturing information, including at least an overlay-displaying position of the captured first still frame image in the display area and information from the display area from which the first still frame image is to be captured, wherein forming the annotation image includes the use of a plurality of kinds of the application software executed in parallel.

14. A non-transitory computer readable medium storing a program causing a computer to execute a process for a remote instruction, the process comprising:

overlay-displaying a first still frame image of a target taken in a display area of application software, the first still frame image having been captured from a video signal;

displaying an edited still frame image in the display area by use of the application software;

extracting the edited still frame image displayed according to a difference between displayed still frame images prior to and subsequent to a generation of the edited still image;

forming an annotation image from the edited still frame image extracted to project the annotation image onto an image-taken area according to an instruction given on the basis of a taken image; and storing image capturing information, including at least an overlay-displaying position of the captured first still frame image in the display area and information from the display area from which the first still frame image is to be captured, wherein forming the annotation image includes the use of a plurality of kinds of the application software executed in parallel.

15. A remote instruction system comprising:

an annotation forming portion that:

overlay-displays a first still frame image of a target taken by an image taking portion, in a display area of application software, the image taking portion having captured the first still frame image from a video signal, the application software being commonly used software executable on a computer that has a display screen on which an editing window is displayed and that has a drawing function;

displays an edited still frame image in the display area by use of the application software;

extracts the edited still frame image displayed according to a difference between displayed images prior to and subsequent to a generation of the edited still frame image; and forms an annotation image from the edited still frame image extracted to project the annotation image onto an image-taken area of the image taking portion by a projecting portion according to an instruction given on the basis of a taken image, and a layout information memory portion that stores image capturing information, including at least an overlay-displaying position of the captured first still frame image in the display area of the application software and information from the display area from which the first still frame image is to be captured.

16. The remote instruction system according to claim 15, wherein the annotation forming portion automatically calibrates a deviation caused by at least a server-client relationship, the application software, or a difference in a region between the image taken area and the display area of the application software.

\* \* \* \* \*